(12) United States Patent
Fujimoto

(10) Patent No.: US 11,377,210 B2
(45) Date of Patent: Jul. 5, 2022

(54) MONITORING SYSTEM AND MOBILE ROBOT DEVICE

(71) Applicant: RAMROCK, CO., LTD., Iizuka (JP)

(72) Inventor: Ryuji Fujimoto, Iizuka (JP)

(73) Assignee: RAMROCK, CO., LTD., Iizuka (JP)

( * ) Notice: Subject to any disclaimer, the term of this patent is extended or adjusted under 35 U.S.C. 154(b) by 466 days.

(21) Appl. No.: 16/347,164

(22) PCT Filed: Nov. 7, 2016

(86) PCT No.: PCT/JP2016/082972
§ 371 (c)(1),
(2) Date: May 2, 2019

(87) PCT Pub. No.: WO2018/083798
PCT Pub. Date: May 11, 2018

(65) Prior Publication Data
US 2020/0055597 A1     Feb. 20, 2020

(51) Int. Cl.
| | |
|---|---|
| B64C 39/02 | (2006.01) |
| B64D 1/08 | (2006.01) |
| G05D 1/02 | (2020.01) |
| G08B 25/14 | (2006.01) |
| H04Q 9/00 | (2006.01) |

(52) U.S. Cl.
CPC .......... *B64C 39/024* (2013.01); *B64D 1/08* (2013.01); *G05D 1/0202* (2013.01); *G08B 25/14* (2013.01); *H04Q 9/00* (2013.01); *B64C 2201/127* (2013.01); *B64C 2201/128* (2013.01); *B64C 2201/141* (2013.01)

(58) Field of Classification Search
CPC ........... B64C 39/024; B64C 2201/127; B64C 2201/128; B64C 2201/141; B64C 2201/126; B64D 1/08; G05D 1/0202; G05D 1/0094; G08B 25/14; G08B 13/1965; H04Q 9/00
See application file for complete search history.

(56) References Cited

U.S. PATENT DOCUMENTS

| | | | |
|---|---|---|---|
| 9,321,531 B1* | 4/2016 | Takayama | ............. B64C 39/024 |
| 9,422,139 B1 | 8/2016 | Bialkowski et al. | |
| 2018/0357909 A1* | 12/2018 | Eyhorn | ................ G08G 5/0013 |

FOREIGN PATENT DOCUMENTS

| | | |
|---|---|---|
| JP | 2002-293298 A | 10/2002 |
| JP | 2005-269413 A | 9/2005 |
| JP | 2007-58530 A | 3/2007 |
| JP | 2010-29314 A | 2/2010 |
| JP | 2011-128911 A | 6/2011 |
| JP | 2014-153972 A | 8/2014 |
| JP | 2014-192784 A | 10/2014 |
| JP | 2015-207149 A | 11/2015 |
| JP | 2016-189114 A | 11/2016 |

* cited by examiner

*Primary Examiner* — Yuen Wong
(74) *Attorney, Agent, or Firm* — Heedong Chae; Lucem, PC

(57) ABSTRACT

A monitoring system that includes a monitoring center unit, a monitoring camera, and a drone device. The monitoring system is a system for monitoring a monitoring target area in a predetermined range, starting the drone device when an abnormality is detected, and dealing with the generated abnormality.

8 Claims, 1 Drawing Sheet

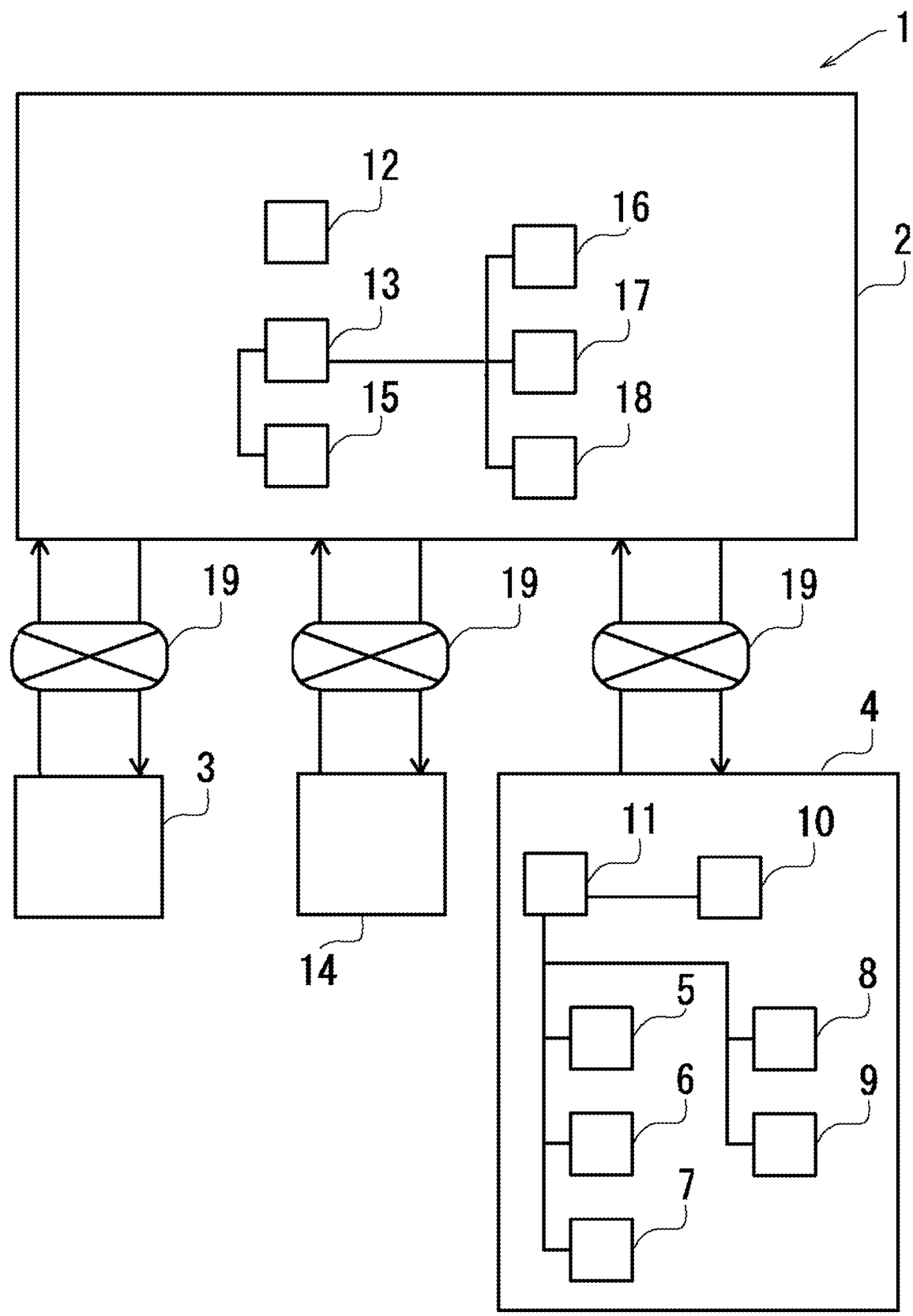

MONITORING SYSTEM AND MOBILE ROBOT DEVICE

BACKGROUND OF THE INVENTION

1. Field of the Invention

The present disclosure relates to a monitoring system and a mobile robot device. More specifically, the present disclosure relates to a monitoring system and a mobile robot device that are capable of promptly dealing with an abnormality when the abnormality occurs and are applicable to a wide area to be monitored.

2. Description of the Prior Art

In recent years, the use of monitoring systems and alarm devices using self-propelled mobile robots has been spreading. It is expected that the monitoring systems and alarm devices will be used for various purposes due to the fact that it is possible to reduce the manpower related to monitoring and that it is possible to perform confirming work even in the place where danger is accompanied.

A mobile robot patrols a predetermined monitoring area in accordance with a prescribed program, and when an intruder is detected or any abnormality such as a fire is detected, the mobile robot has a function of transmitting image information to the outside, making an alarm sound, or the like.

Under these circumstances, there is an alarm system that operates a television using a remote-control signal to threaten an intruder when a cleaning robot having a control function of a home appliance detects an intruder, and an alarm system disclosed in Patent Document 1 is proposed.

In addition, there is also a monitoring system that monitors a person to be protected using a wirelessly controlled unmanned aircraft (hereinafter, referred to as "drone device") capable of three-dimensional movement. For example, the monitoring system described in Patent Document 2 is proposed.

PRIOR ART DOCUMENT

Patent Document

Patent Document 1: Japanese Patent Publication No. 2014-153972
Patent Document 2: Japanese Patent Publication No. 2015-207149

SUMMARY OF THE INVENTION

Here, the alarm system described in Patent Document 1 is very limited in that an object to be monitored is a house in which a cleaning robot is installed, and is not applied to monitoring in a wide area.

In the monitoring system described in Patent Document 2, since a flyable drone device is used, it is possible to monitor a wide area. However, the monitoring system is intended to protect an individual person to be monitored and the use thereof is limited. That is, for example, the monitoring system is not configured as a monitoring system that is capable of quickly dealing with an accident or a disaster when the accident or the disaster occurs.

The present disclosure has been conceived in consideration of the foregoing points and provides a monitoring system and a mobile robot device that are capable of quickly dealing with an abnormality when the abnormality occurs and are applicable to a wide area to be monitored.

In view of the foregoing, the monitoring system of the present disclosure includes: a mobile robot device configured to autonomously move, the mobile robot device including a start information reception unit configured to receive start information to initiate a movement to a predetermined target position, and a control information storage unit configured to store control information to perform a predetermined work when the mobile robot device reaches the target position; a first imaging unit configured to acquire imaging information in a monitoring target area; and a monitoring center unit including a start information transmission unit configured to transmit start information to move the mobile robot to the target position when an abnormality is detected in an imaging area of imaging information acquired by the first imaging unit.

Here, the range in which a mobile robot device is movable may be monitored by the mobile robot device that is capable of autonomously moving.

In addition, since the mobile robot device has the start information reception that receives start information to initiate a movement to the predetermined target position, the mobile robot device quickly starts moving toward the target position on the basis of the start information.

In addition, since the mobile robot device has a control information storage unit, which stores control information to perform a predetermined work when reaching the target position, it becomes possible to cause the mobile robot device to perform the predetermined work when the mobile robot device reaches the target position.

In addition, by means of the first imaging unit that acquires imaging information in the monitoring target area, it is possible to perform an operation of determining whether or not an abnormality is present on the basis of the imaging information of the monitoring target area.

In addition, by means of the monitoring center unit including the start information transmission unit configured to transmit start information to move the mobile robot device to the target position when an abnormality is detected in an imaging area of imaging information acquired by the first imaging unit, the mobile robot device is caused to start to the target position in response to an instruction from the monitoring center unit. Here, the wording "when an abnormality is detected in the imaging area" referred to here means, for example, the state in which a monitoring operator confirms an abnormality while looking at the imaging information obtained by the first imaging unit.

In addition, in the case in which the monitoring center unit has the terrain information storage unit, which stores the terrain information of the monitoring target area, it becomes possible to transmit start information based on the terrain information of the monitoring target area to the mobile robot device. That is, for example, it becomes possible to set detailed target position information and to provide information on the shortest route along which the mobile robot device moves in the monitoring area.

In addition, when the mobile robot device is a drone device capable of flying, it is possible to set a wider area as a monitoring target area.

In addition, when the mobile robot device has an object holding unit that holds a predetermined object, it is possible to cause the mobile robot device to hold the object. The term "predetermined object" referred to here is an object that can be selected variously depending on a corresponding use, such as an automatic external defibrillator (AED), a floating tube, food for disaster, an extinguishing agent, or a color ball.

In addition, when the mobile robot device has the object holding unit that holds a predetermined object, and when the control information storage unit stores information to release the object held by the object holding unit at the target position, it becomes possible to bring the object to the target position.

In addition, when the mobile robot device includes the second imaging unit configured to acquire imaging information, and the imaging information display signal transmission unit configured to transmit a signal that enables display of imaging information acquired by the second imaging unit on an external terminal screen, it becomes possible to confirm the imaging information captured by the mobile robot device on an external terminal. As a result, it becomes possible for the monitoring worker to confirm the situation in more detail by acquiring imaging information acquired during the movement of the mobile robot device, imaging information of the target position, and the like.

In addition when the mobile robot device has the position information transmission unit configured to transmit position information, and when the monitoring center unit includes a stop position information storage unit configured to receive the position information transmitted from the flight position information transmission unit and to store position information of a position at which the mobile robot device stops without reaching the target position, and an avoidance information processor configured to add avoidance information to avoid a position corresponding to the stop position information to the start information based on the stop position information and the topography information, it is possible to improve the accuracy with which the mobile robot device reaches the target position without delay. That is, for example, when the mobile robot device collides with a building or is stopped by being blown by a strong wind, it becomes possible to reflect the position information of the place where the mobile robot device was not movable as reference information at the next start.

In view of the foregoing, a monitoring system of the present disclosure includes: a mobile robot device configured to autonomously move, the mobile robot device including a start information reception unit configured to receive start information to initiate a movement to a predetermined target position, and a control information storage unit configured to store control information to perform a predetermined work when the mobile robot device reaches the target position; a parameter information acquisition unit configured to acquire information on a predetermined parameter obtained from within the monitoring target area; and a monitoring center unit including a parameter information determination unit configured to determine whether or not the parameter information acquired by the parameter information acquisition unit satisfies a predetermined condition and a start information transmission unit configured to transmit start information to move the mobile robot device to the target position when the parameter information determination unit determines that the acquired parameter information satisfies the predetermined condition.

Here, by means of the parameter information acquisition unit that acquires information of the predetermined parameter obtained from within the monitoring target area, it becomes possible to confirm the situation of the monitoring target area on the basis of a predetermined parameter.

Further, by means of the parameter information acquisition unit configured to acquire predetermined parameter information obtained from within the monitoring target area, and the parameter information determination unit configured to determine whether or not the parameter information acquired by the parameter information acquisition unit satisfies a predetermined condition, it is possible to perform a determination according to the parameter reflecting the situation of the monitoring area and the content of the parameter. That is, for example, by setting information of a certain parameter and the reference value of the parameter and by determining whether or not the acquired parameter exceeds the reference value, it becomes possible to detect an abnormality.

In the case in which the monitoring center unit determines that the parameter information acquired by the parameter information determination unit satisfies the predetermined condition, by including the start information transmission unit configured to transmit start information to move the mobile robot device to the target position, it becomes possible to detect an abnormality based on the information of the acquired parameter and to start the mobile robot device.

In addition, in the case in which the parameter information is at least one selected from temperature information, humidity information, pressure information, luminance information, volume information, color tone information, and odor information, it becomes possible to determine whether or not an abnormality is present on the basis of each acquired value of information, and to start the mobile robot device.

In view of the foregoing, the monitoring system includes a monitoring center unit including a start information transmission unit configured to transmit start information to move a mobile robot device to a target position when an abnormality is detected within an imaging area of imaging information acquired within a monitoring target area. The mobile robot device is configured to autonomously move and to store control information to perform a predetermined work when reaching the target position.

Here, by means of the monitoring center unit including the start information transmission unit configured to transmit start information to move the mobile robot device to the target position when an abnormality is detected within an imaging area of imaging information acquired within the monitoring target area, in which the mobile robot device is configured to autonomously move and to store control information to perform a predetermined work when reaching the target position, it becomes possible to rapidly start the mobile robot device to the target position. In addition, it becomes to cause the mobile robot device to perform a predetermined work when the mobile robot device reaches the target position.

In view of the foregoing, a mobile robot device of the present disclosure is configured to autonomously move and includes a start information reception unit configured to receive start information to initiate a movement to a predetermined target position when an abnormality is detected within an imaging area of imaging information acquired within a monitoring target area, and a control information storage unit configured to store control information to perform a predetermined work when reaching the target position.

Here, by means of the start information reception unit configured to receive start information to initiate a movement to the predetermined target position when an abnormality is detected within the imaging area of imaging information acquired within the monitoring target area, the mobile robot device rapidly starts moving toward the target position on the basis of the start information.

In addition, by means of the control information storage unit, which stores control information to perform a predetermined work when reaching the target position, it becomes possible to cause the mobile robot device to perform the predetermined work when the mobile robot device reaches the target position.

The monitoring system and the mobile robot device according to the present disclosure are capable of rapidly dealing with an abnormality when the abnormality occurs, and are also applicable to a wide monitoring target area.

BRIEF DESCRIPTION OF THE DRAWINGS

The above and other aspects, features and advantages of the present disclosure will be more apparent from the following detailed description taken in conjunction with the accompanying drawings, in which:

FIG. 1 is a schematic block diagram illustrating the content of a monitoring system to which the present disclosure is applied.

DETAILED DESCRIPTION OF THE EXEMPLARY EMBODIMENTS

Hereinafter, embodiments of the present disclosure will be described with reference to the drawings to help the understanding of the present disclosure.

FIG. 1 is a schematic block diagram illustrating the content of a monitoring system to which the present disclosure is applied. The structure illustrated below is an example of the present disclosure, and the contents of the present disclosure are not limited thereto.

As illustrated in FIG. 1, a monitoring system 1, which is an example of a monitoring system to which the present disclosure is applied, includes a monitoring center unit 2, a monitoring camera 3, and a drone device 4. In addition, the term "drone device" 4 as used herein mean an unmanned aircraft capable of remote control or autonomous flight.

The monitoring system 1 is a system for monitoring a monitoring target area in a predetermined range, starting the drone device 4 when an abnormality is detected, and dealing with the generated abnormality.

The monitoring camera 3 is a tool for acquiring image information and is installed in the monitoring target area of the monitoring system 1. The monitoring camera 3 acquires real-time image information, and transmits the image information to the monitoring center unit 2. The monitoring camera 3 is installed in various places in the monitoring target area, for example, a hill where the monitoring target area can be widely viewed or a place where an accident is likely to occur.

The drone device 4 is an autonomous flight device, and is disposed at a drone standby position in the monitoring target area. Based on start information from the monitoring center unit 2, the drone device 4 starts flying from the drone standby position. In addition, the drone device 4 is configured to be capable of remote control. In addition, a plurality of drone devices 4 and drone standby positions may be provided in a single monitoring target area.

Here, in the monitoring system and the mobile robot device to which the present disclosure is applied, the mobile robot device is not limited to the flyable drone device, and may be any robot as long as the robot is capable of moving independently and capable of performing a predetermined processing operation on the basis of control information recorded therein or control information received from the outside. For example, it is possible to employ a robot of a type that moves on the ground by driving wheels. However, by using the drone device 4, it is possible to set the monitoring target area more widely, and to quickly reach a target position.

In addition, it is not always necessary that the drone standby position is installed within the monitoring target area, and the drone standby position may be provided outside the monitoring target area as long as it is possible to quickly move to the monitoring target area from the position.

The flight of the drone device 4 is controlled on the basis of terrain information data in the monitoring target area, more specifically, on the basis of three-dimensional coordinate data. That is, the flight of the drone device 4 is controlled on the basis of the coordinate data in the horizontal x-axis and y-axis directions in the monitoring target area and the coordinate data in the vertical z-axis direction. In addition, the coordinate data in the vertical z-axis direction is not limited to the topography of the terrain, but includes records of objects that may become obstacles to the flight of the drone device 4, such as buildings having a certain height in the monitoring target area. Thus, the drone device 4 is capable of flying while avoiding obstacles.

Here, it is not necessary that the flight control of the drone device is based on the three-dimensional coordinate data. For example, as an additional function, a conventionally known displacement sensor, a measurement sensor, or the like may be provided to avoid a collision with an object.

The drone device 4 has an arm unit 5 capable of holding an object. The arm unit 5 is a member for holding and transporting an object having a weight, which allows the drone device 4 to stably fly in the state of holding the object, to the target position. The arm unit 5 is configured to be capable of holding and releasing an object on the basis of predefined control information or additional control information transmitted from the monitoring center unit 2.

In addition, the drone device 4 has an on-board camera 6 and is configured to be capable of transmitting image information picked up from the flying drone device 4 to the monitoring center unit 2.

In addition, the drone device 4 has a GPS unit 7 and is configured to be capable of transmitting its own flight position information to the monitoring center unit 2 using a conventionally known global positioning system (GPS). In addition, this positional information is represented by three-dimensional coordinate data within the monitoring target area.

Further, the drone device 4 has a sound transmission unit 8. Audio information recorded in advance in the drone device 4 and audio information of a monitoring worker located in the monitoring center unit 2 may be emitted through the sound transmission unit 8. Further, the sound transmission unit 8 may also emit an alarm sound or the like.

Further, the drone device 4 has a sound reception unit 9. The sound reception unit 9 may pick up sounds such as voices and sounds in the vicinity of the drone device 4, and may transmit sound information to the monitoring center unit 2.

The drone device 4 has a start information reception unit 10. The start information reception unit 10 receives start information transmitted from the monitoring center unit 2, and serves as the starting point of the start to a target position. The detailed content of the start information will be described later.

The drone device 4 has a control information storage unit 11, which is stored with information on handling work according to abnormal situations expected to occur. Here, the abnormal situations may include, for example, (1) occurrence of a person drowning in a sea, (2) occurrence of a person who falls down due to illness or the like, (3) occurrence of fire, (4) occurrence of an accident of a vehicle, bicycles, or the like, (5) occurrence of crime such as robbery, and (6) occurrence of distress in a mountain.

In addition, the information on handling work according to abnormal situations means contents corresponding to the above-mentioned examples, for example, as follows.

(1) Information to fly to a position where the drowning person is present, and to release a floating tube held by the arm unit 5 at the corresponding position. (2) Information to fly to a position where a fallen person is present, and to release an AED held by the arm unit 5 at the corresponding position. (3) Information to fly to the site where the fire occurred, and to spray fire extinguishing agent toward the fire source. Information to image the situation at the fire site with the on-board camera 6. (4) Information to image the on-site situation immediately after the occurrence of the accident with the on-board camera 6. Information to image road traffic conditions around the accident site with the on-board camera 6. (5) Information to image a suspicious person or a fugitive with the on-board camera 6. Information to aim at and throw a colored ball to a criminal immediately after the crime. Information to track from the sky a criminal who escapes. (6) Information to fly around a mountain climbing route and its surroundings, and to image the position to fly with the on-board camera. When the distress position is clear, the information to fly to the target position, and convey food or first-aid equipment held by the arm unit 5 to the position.

In addition, the control information storage unit 11 of the drone device 4 is configured to be capable of receiving additional control information transmitted from the monitoring center unit 2, and performing handling work on the basis of the additional control information.

Specifically, for example, in the case of rescue of the drowning person in case (1) described above, it is assumed that the originally stored control information is the handling work of providing a floating tube after reaching the target position. Here, it is possible to make the drone device 4 perform other handling work, such as allowing a person to be rescued to call the monitoring worker of the monitoring center unit 2 via the sound transmission unit 8 and the sound reception unit 9 as additional control information.

The configuration for allowing the drone device 4 to perform handling work as described above may adopt aspects of transmitting additional control information from the monitoring center unit 2 each time, and storing the information of handling work in the control information storage unit 11 of the drone device 4 in advance.

The monitoring center unit 2 of the monitoring system 1 includes a LAN control unit and a wireless LAN interface, and has an interface function to a wireless LAN. The monitoring center unit 2 is a part that transmits/receives information between the monitoring camera 3 and the drone device 4 via a wireless LAN 19.

The monitoring center unit 2 has a display monitor 12, and is configured to be capable of receiving image information from the monitoring camera 3 and the on-board camera 6 of the drone device 4 and displaying the image information. In addition, the monitoring center unit 2 has a start information transmission unit 13.

The start information transmission unit 13 is a part that transmits start information to the start information reception unit 10 of the drone device 4 described above, and starts the drone device 4 to the target position. The start information is transmitted from the start information transmission unit 13 of the monitoring center unit 2 when an abnormality to be described later is detected in the monitoring target area.

The start information includes information on a target position to be reached by the drone device 4 and information on a flight route of the drone device 4. In addition, the start information may also include additional control information that is information on handling work to be performed by the drone device 4 described above.

The monitoring center unit 2 has a terrain information database 16 in which the terrain information of the monitoring target area is stored. The stored terrain information is information based on three-dimensional coordinate data, and the information also includes position information on a plurality of drone standby positions.

In addition, the terrain information database 16 is linked to a drone position information database described later, and route information of past flight history and information of arrival time to the target position are also stored as history information based on the position information of the drone device 4. The functions based on flight history information will be described later.

(1) Detection of Abnormality Based on Monitoring of Monitoring Worker

As a method of detection of an abnormality in the monitoring target area, there is an aspect in which a monitoring worker monitors the display monitor 12 of the monitoring center unit 2 to confirm the abnormality. The image information monitored by the monitoring worker is information from the monitoring cameras 3 installed at a plurality of places in the area and information from the on-board camera 6 of the drone device 4.

The monitoring worker monitors the image of the display monitor 12, and when any abnormality is recognized in the image, start information is transmitted to the drone device 4 via the start information transmission unit 13 of the monitoring center unit 2. The case where any abnormality is recognized in the image may include, for example, the case where a person to be rescued, such as a person drowning or a fallen person, is confirmed, the case where the occurrence of fire, earthquake, tsunami, tornado, or the like is confirmed, the case where an accident such as a car accident or a bicycle accident is confirmed, the case where the occurrence of a crime such as a robbery at a store is confirmed, or the case where an intruder to a no entry zone is confirmed. In addition, the confirmation of an abnormality by the monitoring worker mentioned here by way of an example is an example of detection of an abnormality of the part of "when an abnormality is detected in an imaged area of imaging information acquired within a monitoring target area" in the claims of the present application.

In addition, the information of the image when the monitoring worker detects an abnormality is not limited to the image information of the fixed monitoring camera 3 and the on-vehicle camera 6 of the drone device 4, which waits at the drone standby position.

For example, for the purpose of security and search, the drone device 4 may be set to fly a predetermined route, and the information on the image captured by the on-board camera 6 when making a tour is monitored to detect an abnormality. During the flight in such security or searching, when a mountain victim is found in the middle of the flight, when a fire occurs, when an intruder is confirmed, etc., control information may be transmitted to the drone device 4 at that timing so as to perform handling work.

(2) Detection of Abnormality Based on Parameter Information

As a method of the detection of abnormality in the monitoring target area, it is also possible to employ a configuration in which an abnormality is determined by the determination based on a predetermined parameter and the reference value thereof and start information is transmitted. The object of the predetermined parameter is information having the numerical value of parameter information that can be measured using an existing measurement device, such as temperature information, humidity information, pressure information, luminance information, volume information, color tone information, odor information, or the like. As the configuration for detecting an abnormality based on parameter information, for example, the contents are as follows.

The parameter information acquisition units 14 are installed at various places in the monitoring target area. Examples of the parameter information acquisition units include measurement devices such as a thermometer, a hygrometer, a pressure sensor, a photometer, a noise meter, a colorimeter, an odor meter, a seismic intensity meter, and a light-shading sensor. The parameter information acquisition unit 14 is installed at a position where it is desired to acquire various pieces of parameter information of the monitoring target area. Measurement information is transmitted to the monitoring center unit 2 each time. The parameter information acquisition unit 14 is configured to be capable of transmitting/receiving information to/from the monitoring center unit 2 via the wireless LAN 19.

The monitoring center unit 2 has a parameter information determination unit 15 that receives the information measured by the parameter information acquisition unit 14 and determines whether or not the measurement information satisfies the conditions of set determination criteria. When it is determined by the parameter information determination unit 15 that the predetermined conditions are satisfied, the start information transmission unit 13 transmits the start information to the drone device 4. In addition, the start information may include information on handling work depending on the types of parameters and the types of satisfied conditions.

For example, using temperature information as parameter information, a thermometer is disposed in the monitoring target area including a sandy beach. The temperature of a measurement target area is measured with a thermometer, and when the temperature exceeds 35° C., the parameter information determination unit 15 determines that the condition of 35° C. or higher temperature set in advance is satisfied, and starts the drone device 4. The start information is set such that, when reaching the target position, while flying in the same area, sound announcement indicating that there is a danger of heat stroke or urging water supply is issued through the sound transmission unit 8. With such a configuration, it is possible to urge attention in a sandy beach area in the middle of summer day in which heat stroke is likely to occur. In addition, as another example of the parameter information, a configuration in which the parameter information determination unit 15 determines that conditions are satisfied when the amount of rainfall in the monitoring target area or the water amount or water level of a river exceed a set reference amount or level may be adopted. In addition, the parameter information may be set on the basis of weather conditions and environmental conditions at the site.

In addition, for example, a pressure sensor or an infrared sensor is disposed in the monitoring target area, which is a no entry zone. When the pressure sensor measures a predetermined pressure or when disappearance of infrared light from the infrared sensor is confirmed, the parameter information determination unit 15 determines that the conditions of detection of pressure information having a predetermined value or more set in advance or disappearance of infrared light from the infrared sensor is satisfied, and starts the drone device 4. In the start information, handling information to image the periphery of the target area with the on-board camera and to emit an alarm sound in the corresponding area when the mobile robot device reaches the target position, and to fly and track an intruder when the intruder escapes is set. With such a configuration, it is possible to efficiently guard the monitoring target area where it is desired to prevent an intruder from intruding.

In addition, for example, a thermometer, a monitoring camera, and a thermography are installed in an area, such as an indoor area or a mountain area where fire is not permitted. When the temperature of the reference value or more is measured by thermometer or thermography information, the parameter information determination unit 15 determines that the condition of detection of temperature information of a predetermined value set in advance or more is satisfied, and starts the drone device 4. In the start information, handling information to spray the held fire extinguishing agent on a high temperature part, to give the sound of urging attention to a person located in the corresponding area is heard, and to image the situation of the site with the on-board camera when the mobile robot device reaches the target position is set. With Such a configuration, it is possible to prevent the occurrence of a fire or reduce damage.

In the examples described above, the configuration in which the start information is transmitted on the basis of a single piece of parameter information and determination criteria thereof, but the contents of the present disclosure are not limited thereto. For example, it is possible to employ the configuration in which a determination is made and an abnormality is detected on the basis of a result of combining a plurality of pieces of parameter information.

In addition, a plurality of combinations of the detection of an abnormality by the parameter information determination unit 15 and handling information of the drone device 4 according to the detection may be defined. For example, an example of response to a fire based on the above-described temperature information will be described. In the start information when the measured temperature information is within a predetermined temperature range, the fire extinguishing agent is sprayed by the drone device 4. Then, when the temperature information that a high reference temperature is reached is measured, it is also possible to switch stepwise handling information, such as broadcasting evacuation alarm to surrounding people indicating that it is necessary to escape, and/or initiating recording using a monitoring camera.

In addition, in the detection of an abnormality based on the parameter information, the monitoring center unit 2 does not necessarily have to be provided with the parameter information determination unit 15. For example, the parameter information acquisition unit 14 may be configured to have a function of determining parameter information, and to transmit information detected as being abnormal to the monitoring center unit 2.

A flight route correction function of the monitoring system 1, which is an example of the monitoring system to which the present disclosure is applied will be described.

When the drone device 4 does not reach the target position due to a certain accident after starting, this flight route correction function reflects this in the subsequent flight on the basis of the flight route at that time.

First, as described above, the drone device 4 has the GPS unit 7, and is configured to be capable of transmitting its own position information to the monitoring center unit 2. In addition, the monitoring center unit 2 has a drone position information database 17 interlocked with the terrain information database 16. Position information transmitted from the drone device is accumulated in drone position information database 17, so that information on the flight route, information on the time required to reach the target position, and the like are stored.

In addition, the monitoring center unit 2 has a flight information update unit 18. The flight information update unit 18 is a part that records the stop position information of the drone device 4 that has not reached the target position and that updates start information such that the drone device 4 flies along the flight route that avoids the area corresponding to the stop position information for the next start information.

In addition, the stop position information referred to here includes not only the information of the stopped position when the function of the GPS unit 7 is working effectively, but also the position information acquired immediately before the position information disappears in the state in which position information cannot be obtained from the GPS unit 7 (e.g., in the state in which the drone device 4 is broken and the GPS unit 7 also does not function).

In addition, when the position to be avoided was the target position, it is possible to suitably correct the start information such that the position to be avoided is not reflected in the start information, or that a place slightly away from the target position is set as the target position.

As described above, by the position information of the drone device 4 and the flight route correction function implemented by the flight information update unit 18, it is possible to enhance the accuracy with which the drone device 4 is able to reach the target position.

As described above, the monitoring system of the present disclosure is capable of rapidly dealing with an abnormality when the abnormality occurs, and is also applicable to a wide monitoring target area.

In addition, the mobile robot device of the present disclosure is capable of rapidly dealing with an abnormality when the abnormality occurs, and is also applicable to a wide monitoring target area.

DESCRIPTION OF REFERENCE NUMERAL

1: monitoring system
2: monitoring center unit
3: monitoring camera
4: drone device
5: arm unit
6: on-board camera
7: GPS unit
8: sound transmission unit
9: sound reception unit
10: start information reception unit
11: control information storage unit
12: display monitor
13: start information transmission unit
14: parameter information acquisition unit
15: parameter information determination unit
16: terrain information database
17: drone position information database
18: flight information update unit
19: wireless LAN

What is claimed is:

1. A monitoring system comprising:
a mobile robot device configured to autonomously move, the mobile robot device including a start information reception unit having a receiver and configured to receive start information to initiate a movement to a predetermined target position, a global positioning system (GPS) capable of transmitting a flight position information that is represented by three-dimensional coordinate data within the predetermined target area, and a control information storage unit having a first storage medium and configured to store control information to perform a predetermined work when the mobile robot device reaches the predetermined target position;
a camera installed in a monitoring target area; and
a monitoring center unit including a start information transmission unit having a first transmitter and configured to transmit the start information to move the mobile robot device to the predetermined target position when an abnormality is detected in an imaging area based on the imaging information acquired by the camera,
wherein the monitoring center unit further includes a flight position information transmission unit having a second transmitter and configured to transmit the flight position information, a terrain information storage unit having a second storage medium and configured to store terrain information of the monitoring target area, a stop position information storage unit having a third storage medium and configured to receive the position information transmitted from the flight position information transmission unit and to store position information of a position at which the mobile robot device stops to move to the predetermined target position, and an avoidance information processor configured to add avoidance information to avoid a position corresponding to the stop position information to the start information based on the stop position information and a topography information,
wherein the abnormality includes image information about a predetermined condition where a person needs to be rescued, a person has fallen, a person has drowned or is drowning, a natural disaster has occurred, fire has occurred, earthquake has occurred, tsunami has occurred, tornado has occurred, an accident has occurred, a car accident has occurred, a bicycle accident has occurred, a crime has occurred, a robbery has occurred, or a trespassing has occurred,
wherein the abnormality is detected by a monitoring worker who monitors an image from the camera, or by monitoring whether or not parameter information satisfies the predetermined condition,
wherein the predetermined work includes releasing an automatic external defibrillator, a floating tube, food for disaster, an extinguishing agent, or a color ball.

2. The monitoring system of claim 1, wherein the mobile robot device is a drone device configured to be capable of flying.

3. The monitoring system of claim 1, wherein the mobile robot device is configured to hold a predetermined object, and the control information storage unit stores information to release the predetermined object held by the mobile robot device at the predetermined target position.

4. The monitoring system of claim 1, wherein the mobile robot device is configured to transmit a signal that enables display of the imaging information on an external terminal screen.

5. The monitoring system of claim 1, further comprising:
a parameter information acquisition unit configured to acquire a predetermined parameter information obtained from within the monitoring target area,
wherein the monitoring center unit is further configured to determine whether or not the predetermined parameter information acquired by the parameter information acquisition unit satisfies the predetermined condition, and
wherein the start information transmission unit is configured to transmit the start information to move the mobile robot device to the predetermined target position when the parameter information determination unit determines that the predetermined parameter information satisfies the predetermined condition,
wherein the parameter information acquisition unit is a measurement device selected from the group consisting of a thermometer, a hygrometer, a pressure sensor, a photometer, a noise meter, a colorimeter, an odor meter, a seismic intensity meter, and a light-shading sensor.

6. The monitoring system of claim 5, wherein the parameter information is at least one selected from temperature information, humidity information, pressure information, luminance information, volume information, color tone information, and odor information.

7. The monitoring system of claim 1, wherein the start information comprises the predetermined target position, a flight route to the predetermined target position, and the predetermined work, wherein the start information is corrected when the mobile robot device does not reach the predetermined target position due to a certain accident after starting.

8. The monitoring system of claim 1, wherein the mobile robot device
is configured to emit an alarm sound or an audio information of the monitoring worker,
and to receive sounds in a vicinity of the mobile robot device and transmit the sounds to the monitoring center unit.

* * * * *